US011003700B2

(12) United States Patent
Ma

(10) Patent No.: US 11,003,700 B2
(45) Date of Patent: *May 11, 2021

(54) METHODS AND SYSTEMS FOR QUERY SEGMENTATION IN A SEARCH

(71) Applicant: Tencent Technology (Shenzhen) Company Limited, Shenzhen (CN)

(72) Inventor: Chao Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 353 days.

This patent is subject to a terminal disclaimer.

(21) Appl. No.: 16/049,312

(22) Filed: Jul. 30, 2018

(65) Prior Publication Data

US 2018/0336270 A1 Nov. 22, 2018

Related U.S. Application Data

(63) Continuation of application No. 14/609,091, filed on Jan. 29, 2015, now Pat. No. 10,061,844, which is a (Continued)

(30) Foreign Application Priority Data

Sep. 16, 2013 (CN) .......................... 201310422879.4

(51) Int. Cl.
*G06F 16/33* (2019.01)
*G06N 20/00* (2019.01)
*G06N 7/00* (2006.01)

(52) U.S. Cl.
CPC ...... *G06F 16/3344* (2019.01); *G06F 16/3334* (2019.01); *G06N 7/005* (2013.01); *G06N 20/00* (2019.01)

(58) Field of Classification Search
CPC . G06F 16/3344; G06F 16/3334; G06N 20/00; G06N 7/005
(Continued)

(56) References Cited

U.S. PATENT DOCUMENTS

2002/0052871 A1   5/2002   Chang et al.
2008/0077570 A1   3/2008   Tang et al.
(Continued)

FOREIGN PATENT DOCUMENTS

CN        1916905 A      2/2007
CN      101071420 A     11/2007
(Continued)

OTHER PUBLICATIONS

Tencent Technology, ISRWO, PCT/CN2014/081397, dated Oct. 10, 2014, 6 pgs.
(Continued)

*Primary Examiner* — Hosain T Alam
*Assistant Examiner* — Saba Ahmed
(74) *Attorney, Agent, or Firm* — Morgan, Lewis & Bockius LLP

(57) ABSTRACT

The present application discloses a method for segmenting a search query. A server receives a search query including an ordered sequence of Chinese characters. For each Chinese character, one or more predetermined search terms are identified and then combined to form concatenated search queries, each concatenated search query including at least one segmentation identifier that separates the Chinese characters of the ordered sequence of Chinese characters. A specific concatenated search query is identified based on search probabilities of the concatenated search queries. The specific concatenated search query is further segmented into two or more search terms according to one or more locations of the at least one segmentation identifier in the specific concatenated search query. Finally, at least one new search term is identified from the two or more search terms such that one of the ordered sequence of Chinese characters occupies the first position of the new search term.

20 Claims, 7 Drawing Sheets

Related U.S. Application Data continuation of application No. PCT/CN2014/081397, filed on Jul. 1, 2014.

(58) Field of Classification Search
USPC .......................................................... 707/739
See application file for complete search history.

(56) References Cited

U.S. PATENT DOCUMENTS

| | | |
|---|---|---|
| 2011/0231347 A1 | 9/2011 | Xu et al. |
| 2016/0189047 A1 | 6/2016 | Meij et al. |

FOREIGN PATENT DOCUMENTS

| | | | |
|---|---|---|---|
| CN | 101082908 | A | 12/2007 |
| CN | 101118555 | A | 2/2008 |
| CN | 102063424 | A | 5/2011 |
| CN | 102339294 | A | 2/2012 |
| CN | 102929902 | A | 2/2013 |
| CN | 103294817 | A | 9/2013 |
| EP | 2154631 | A2 | 2/2010 |
| JP | 2005293217 | A | 10/2005 |

OTHER PUBLICATIONS

Tencent Technology, IPRP, PCT/CN2014/081397, dated Mar. 22, 2016, 4 pgs.

Search query including a sequence of semantic elements: X1 X2 X3 X4 X5

Search terms → modified search terms

X1 X2 A X3 → X1 X2 0 X3
(F1)

X2 B X3 → X2 0 X3
(F5)

X3 → X3
(F7)

X4 X5 → X4 X5
(F8)

X5 → X5
(F10)

X1 X2 X3 → X1 X2 X3
(F2)

X2 C X3 X4 → X2 0 X3 X4
(F6)

X4 D X5 → X4 0 X5
(F9)

X1 X2 → X1 X2
(F3)

X1 → X1
(F4)

X1, X2, X3, X4, X5 – semantic elements
A, B, C, D – irrelevant semantic elements
0 – segmentation identifier
F1 – F10: search probabilities Combined Search Queries

X1 X2 0 X3 – X4 X5

X1 X2 0 X3 – X4 0 X5

X1 X2 X3 – X4 X5

X1 X2 X3 – X4 0 X5

X1 X2 – X3 – X4 X5

X1 X2 – X3 – X4 0 X5

X1 – X2 0 X3 – X4 X5

X1 – X2 0 X3 – X4 0 X5

X1 – X2 0 X3 X4 – X5

Modified Search Queries $P1 = (F1 + F8)/2$ $P2 = (F1 + F9)/2$ $P3 = (F2 + F8)/2$ $P4 = (F2 + F9)/2$ $P5 = (F3 + F7 + F8)/3$ $P6 = (F3 + F7 + F9)/3$ $P7 = (F4 + F5 + F8)/3$ $P8 = (F4 + F5 + F9)/3$ $P9 = (F4 + F6 + F10)/3$ Max (P1, P2, P3, ..., P9) = P7
So, segmentation result:
X1 X2 and X3 X4 X5

FIG. 2A

METHODS AND SYSTEMS FOR QUERY SEGMENTATION IN A SEARCH

PRIORITY CLAIMS AND RELATED APPLICATIONS

This application is a continuation application of U.S. patent application Ser. No. 14/609,091, entitled "METHODS AND SYSTEMS FOR QUERY SEGMENTATION IN A SEARCH" filed on Jan. 29, 2015, which is a continuation application of PCT Patent Application No. PCT/CN2014/081397, entitled "METHODS AND SYSTEMS FOR QUERY SEGMENTATION IN A SEARCH" filed on Jul. 1, 2014, which relates to Chinese Patent Application No. 201310422879.4, entitled "METHOD, APPARATUS AND SERVER FOR CHINESE QUERY SEGMENTATION," filed on Sep. 16, 2013, all of which are incorporated by reference in their entirety.

TECHNICAL FIELD

The disclosed implementations relate generally to the field of information search, and in particular, to methods, servers and computer program products for processing a search query received by a search engine.

BACKGROUND

As search technology and users' search requests get sophisticated, state-of-the-art search engines are oftentimes faced with challenges to search in accordance with complicated search queries that include many key words. The search engines can only deliver a low success rate, when the search queries are directly used for search. Rather, the search engines may choose to segment a search query to some key words, and search with the segmented key words. The search engines then combine search results of the segmented key words to obtain a list of search results for the search query that includes the segmented words.

For example, a search query inputted in Chinese is segmented based on a statistics-based machine learning method. This machine learning method specifically includes the following steps: (1) collecting a set of texts from publically issued data sources, such as a media source; (2) manually selecting and segmenting a subset of the text set; (3) obtaining segmentation rules by statistically analyzing the results of the manual text segmentation; and (4) segmenting the search query inputted in Chinese to a set of key words according to the statistics-based learning segmentation rules.

Despite its acceptable performance for segmenting search queries, the above statistics-based machine learning method demands a huge amount of computational resources and computational time. The accuracy of query segmentation highly relies on the results of manual text segmentation. Errors in the manual query segmentation results propagate to the segmentation rules and subsequent search query segmentation. Moreover, the statistically based machine-learning method does not recognize new key words that have not appeared in manual text segmentation, and therefore, the error rate increases for search queries that involve many specialized key words.

SUMMARY

The above deficiencies and other problems associated with the conventional approaches of segmenting a search query are reduced or eliminated by the application disclosed below. In some embodiments, the application is implemented in a server that has one or more processors, memory and one or more modules, programs or sets of instructions stored in the memory for performing multiple functions. Instructions for performing these functions may be included in a computer program product configured for execution by one or more processors.

One aspect of the application is a method for segmenting a search query. The method includes receiving a query segmentation request including the search query, and the search query includes an ordered sequence of semantic elements. The method further includes for each semantic element of the ordered sequence of semantic elements, correlating the respective semantic element with one or more predetermined search terms each at least including the respective semantic element, and in accordance with a determination that the one or more search terms include one or more irrelevant semantic elements, modifying the one or more search terms by replacing each irrelevant semantic element with a segmentation identifier. The method further includes combining a subset of the modified search terms to form a plurality of combined search queries based on a combination criterion, and each combined search query includes the ordered sequence of semantic elements and at least one segmentation identifier that separates the semantic elements of the ordered sequence of semantic elements. The method further includes determining a plurality of combined search probabilities each corresponding to one of the plurality of combined search queries, and in accordance with the plurality of combined search probabilities, identifying a specific combined search query and segmenting the search query according to a location of the at least one segmentation identifier of the specific combined search query.

Another aspect of the application is a server that includes one or more processors and memory having instructions stored thereon, which when executed by the one or more processors cause the processors to perform operations to receive a query segmentation request including the search query, and the search query includes an ordered sequence of semantic elements. The at least one program further includes instructions to for each semantic element of the ordered sequence of semantic elements, correlate the respective semantic element with one or more predetermined search terms each at least including the respective semantic element, and in accordance with a determination that the one or more search terms include one or more irrelevant semantic elements, modify the one or more search terms by replacing each irrelevant semantic element with a segmentation identifier. The at least one program further includes instructions to combine a subset of the modified search terms to form a plurality of combined search queries based on a combination criterion, and each combined search query includes the ordered sequence of semantic elements and at least one segmentation identifier that separates the semantic elements of the ordered sequence of semantic elements. The at least one program further includes instructions to determine a plurality of combined search probabilities each corresponding to one of the plurality of combined search queries, and in accordance with the plurality of combined search probabilities, identify a specific combined search query and segmenting the search query according to a location of the at least one segmentation identifier of the specific combined search query.

Another aspect of the application is a non-transitory computer readable storage medium storing at least one program configured for execution by at least one processor of a server. The at least one program includes instructions to receive a query segmentation request including the search query, and the search query includes an ordered sequence of semantic elements. The at least one program further includes instructions to for each semantic element of the ordered sequence of semantic elements, correlate the respective semantic element with one or more predetermined search terms each at least including the respective semantic element, and in accordance with a determination that the one or more search terms include one or more irrelevant semantic elements, modify the one or more search terms by replacing each irrelevant semantic element with a segmentation identifier. The at least one program further includes instructions to combine a subset of the modified search terms to form a plurality of combined search queries based on a combination criterion, and each combined search query includes the ordered sequence of semantic elements and at least one segmentation identifier that separates the semantic elements of the ordered sequence of semantic elements. The at least one program further includes instructions to determine a plurality of combined search probabilities each corresponding to one of the plurality of combined search queries, and in accordance with the plurality of combined search probabilities, identify a specific combined search query and segmenting the search query according to a location of the at least one segmentation identifier of the specific combined search query.

Other embodiments and advantages may be apparent to those skilled in the art in light of the descriptions and drawings in this specification.

BRIEF DESCRIPTION OF DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

In order to more clearly describe the technical solution of the embodiment of the application, a brief introduction will be made to the accompanying drawings depicted in the description of the embodiments. The accompanying drawings depicted below are only some embodiments of the application, and those skilled in the art would obtain some other drawings related to some other embodiments of the application.

FIG. 2A is a schematic diagram that explains an exemplary search query segmentation method as shown in FIG. 1 according to some embodiments of the application.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. The appended drawings, however, merely illustrate the more pertinent features of the present disclosure and are therefore not to be considered limiting, for the description may admit to other effective features. In other instances, well-known methods, procedures, components, and circuits have not been described in detail so as not to unnecessarily obscure aspects of the embodiments.

The technical scheme of the embodiment of the application will now be described in connection with the accompanying drawings in the embodiments of the application. Obviously, some, but not all embodiments of the application are described. Based on the embodiments of the application, other embodiments obtained by people having ordinary skill in the art are also within the protective scope of the application.

Figure 1:
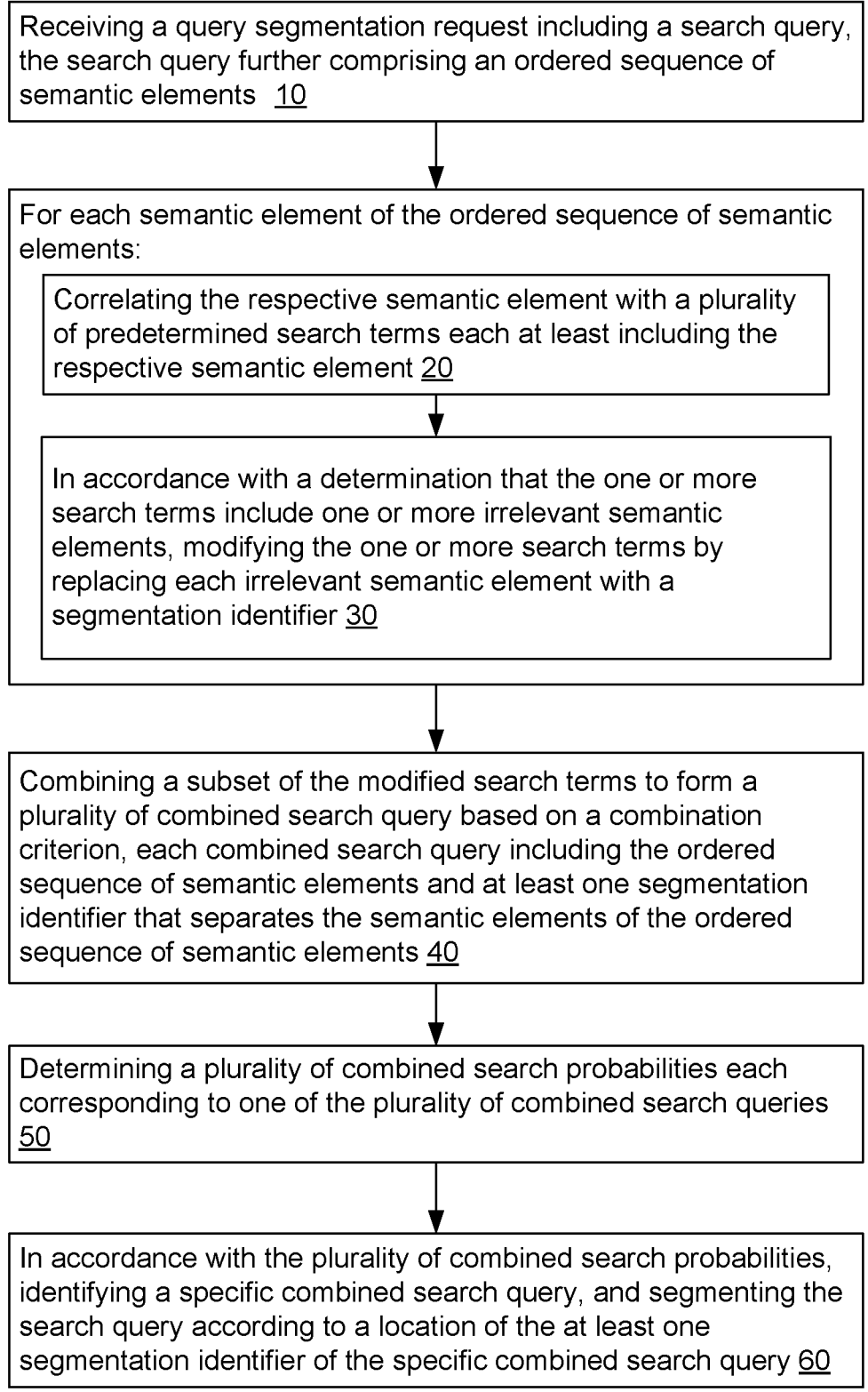
FIG. 1 is a flow chart of an exemplary method for segmenting a search query according to some embodiments of the application.

FIG. 1 is a flow chart of an exemplary method 100 for segmenting a search query according to some embodiments of the application. Method 100 is, optionally, governed by instructions that are stored in a non-transitory computer readable storage medium and that are executed by one or more processors of a computational machine (e.g., a server). Each of the operations shown in FIG. 1 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

Method 100 is performed at a server that provides search service to client devices over the Internet. The server receives (10) a query segmentation request including a search query, and the search query further includes an ordered sequence of semantic elements. In some embodiments, a user interface is enabled at a client device to receive the search query, and the client device then generates and sends the query segmentation request to the server that is remote to the client device. Optionally, the user interface is implemented on a web browser. Optionally, the user interface is implemented as an independent search application or a plug-in component of another software program.

Further, the ordered sequence of semantic elements includes one or more basic language elements in a specific language. For example, the ordered sequence of semantic elements forms a Chinese search query, e.g., "建立繁荣富强的社会主义国家," and each semantic element is a Chinese character. In some embodiments, the search query includes an ordered sequence of basic English semantic elements, such as words, and the basic English words of the search query are separated by spaces. Method 100 is intended to segment the ordered sequence of semantic elements to a plurality of key words (sometimes called search terms) to facilitate the server's search on the background, such that the server may provide more relevant search results in response to the search query.

For each semantic element of the ordered sequence of semantic elements, the respective semantic element is correlated (20) with one or more predetermined search terms each at least including the respective semantic element. In some embodiments, each of the one or more predetermined search terms also includes one or more irrelevant semantic elements. The irrelevant semantic elements in the predetermined search terms are identified, when they are distinct from the respective semantic element correlated with the predetermined search terms and any other semantic elements included in the ordered sequence of semantic elements. Although each predetermined search term at least includes the respective semantic element that it is correlated with, some predetermined search terms are optionally correlated with one or more other semantic elements of the ordered sequence of semantic elements. These semantic elements correlated with the respective predetermined search term are ordered according to their orders in the ordered sequence of semantic elements, but optionally separated by one or more irrelevant semantic elements.

In some embodiments, for each semantic element of the ordered sequence of semantic elements, each of the respective one or more predetermined search terms is associated with a plurality of second semantic elements and a term search probability. Correlating the respective semantic element with the respective one or more predetermined search terms further includes correlating the respective semantic element with each of the respective one or more predetermined search terms, the plurality of respective second semantic elements and the respective term search probability of each of the one or more predetermined search terms.

In some embodiments, the ordered sequence of semantic elements includes a plurality of first semantic elements, and for each first semantic element, the respective one or more search terms includes a plurality of respective first search terms. A plurality of second search terms and a plurality of term search probabilities are obtained based on search queries that are received by the server within a predetermined period of time. Each of the plurality of second search terms is segmented to a plurality of respective second semantic elements, and the plurality of second semantic elements that are associated with the plurality of second search terms includes the plurality of first semantic elements. Further, in accordance with segmentation of the plurality of second search terms, the server establishes a semantic element correlation for each of the second semantic elements by associating each second semantic element with one or more second search terms and term search probabilities of the one or more second search terms. As such, in accordance with the corresponding semantic element correlation for each first semantic element included in the second semantic elements, each semantic element of the ordered sequence of semantic elements is correlated with at least one search term (including the one or more predetermined search terms).

Further, for each semantic element of the ordered sequence of semantic elements, the server determines that the one or more predetermined search terms include one or more irrelevant semantic elements. In accordance with a determination that the one or more predetermined search terms include one or more irrelevant semantic elements, the server modifies (30) the one or more predetermined search terms by replacing each irrelevant semantic element with a segmentation identifier. In some embodiments, when the server modifies the predetermined search terms correlated with each semantic element of the ordered sequence of semantic elements, it keeps one or more semantic elements of the ordered sequence of semantic elements, including the respective semantic element, in each of the one or more predetermined search terms.

In some embodiments, two or more modified search terms are identical after the irrelevant semantic elements are replaced with segmentation identifiers. Query segmentation method 100 further includes merging the identical two or more modified search terms, and obtaining a term search probability corresponding to the merged search term based on the term search probabilities of the identical two or more modified search terms. For example, the term search probability of the merged search term is equal to a sum of the term search probabilities of the identical two or more modified search terms.

The modified search terms are combined (40) to form a plurality of combined search queries based on a combination criterion, and each combined search query includes the ordered sequence of semantic elements and at least one segmentation identifier that separates the semantic elements of the ordered sequence of semantic elements.

In some embodiments, each predetermined search term and its corresponding modified search term are associated with a term search probability that indicates a probability the users of the search service have searched for the respective search term. Among the one or more predetermined search terms correlated with a semantic element, a search term having a larger term search probability is searched by more users of a search service or searched more frequently by users of the search service.

A plurality of combined search probabilities are determined (50) for the plurality of combined search queries, and each combined search probability is associated with one of the plurality of combined search queries. In some embodiments, each combined search query includes a subset of modified search terms each of which is associated with a respective term search probability. The respective combined search probability associated with each combined search query is computed by combining the corresponding term search probabilities of the modified search queries that are included in the respective combined search query. In some embodiments, a combined search probability of a combined search query is an average of the term search probabilities of the corresponding modified search queries that together forms the combined search query. In some embodiments, the combined search probability is a weighted average of the term search probabilities of the corresponding modified search queries.

After determining the plurality of combined search probabilities, the server then identifies (60) a specific combined search query among the plurality of combined search queries, and segments the search query received in the query segmentation request according to a location of the at least one segmentation identifier of the specific combined search query. In some embodiments, the specific combined query is identified because it has a combined search probability larger than that of any other combined search queries of the plurality of combined search queries.

It should be understood that the particular order in which the operations in FIG. 1 have been described are merely exemplary and are not intended to indicate that the described order is the only order in which the operations could be performed. One of ordinary skill in the art would recognize various ways to segment a search query as described herein. Additionally, it should be noted that details of other methods described with respect to methods 300 and 350 (e.g., FIGS. 3A and 3B) are also applicable in an analogous manner to method 100 described above with respect to FIG. 1. For brevity, these details are not repeated here.

Figure 2B:
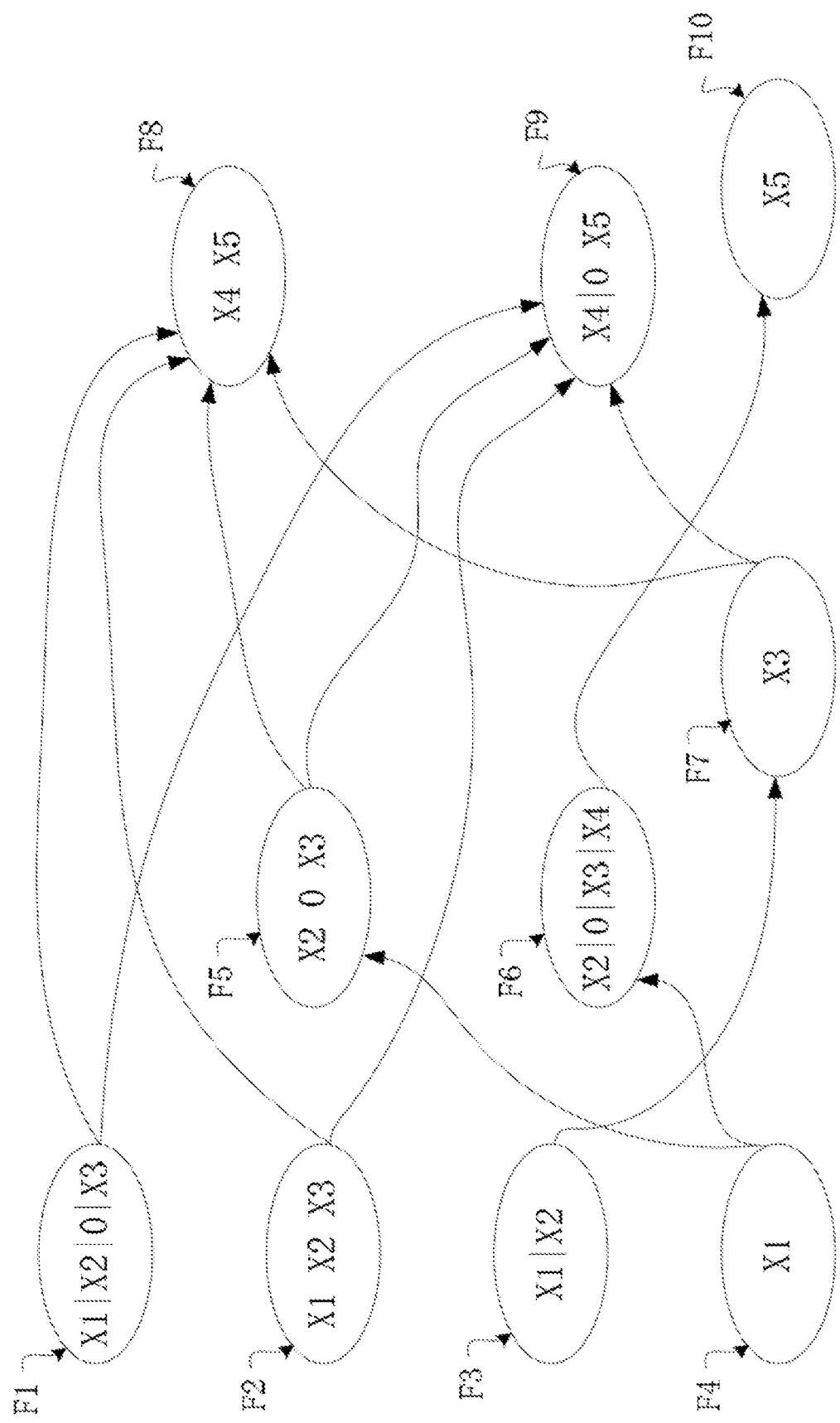
FIG. 2B is a schematic diagram that explains an exemplary path combination operation associated with the search query segmentation method in FIGS. 1 and 2A according to some embodiments of the application.

FIG. 2A is a schematic diagram that explains an exemplary search query segmentation method as shown in FIG. 1 according to some embodiments of the application, and FIG. 2B is a schematic diagram that explains an exemplary path combination operation associated with the above search query segmentation method according to some embodiments of the application. In a specific example, a search server receives a search query that includes an ordered sequence of semantic elements: X1 X2 X3 X4 X5. In some embodiments, the ordered sequence of semantic elements includes a first set of Chinese characters, and semantic elements X1, X2, X3, X4 and X5 are five Chinese characters.

The server correlates semantic element X1 with four search terms including X1 X2 A X3, X1 X2 X3, X1 X2 and X1, and each search term has been searched by users of the search service provided by the server. Each search term represents an ordered sequence of semantic elements at least including semantic element X1. The ordered sequence of semantic elements optionally includes other semantic elements X2, X3, X4 or X5. Likewise, the server correlates semantic element X2 to two search terms including X2 B X3 and X2 C X3 X4, semantic element X3 to one search term X3, semantic element X4 to two search terms X4 X5 and X4 D X5, and semantic element X5 to one search term X5.

In some embodiments, a fixed number of search terms are identified for each semantic element of the ordered sequence of semantic element. However, in some implementations, a search probability threshold is set forth for each semantic element, and a search term is correlated with the semantic element only when its term search probability is larger than the search probability threshold. As such, different semantic elements in the search query are correlated different numbers of search terms. For example, the four search terms associated with semantic element X1 are selected, because their term search probabilities F1, F2, F3 and F4 are larger than a predetermined search probability threshold. The other search terms associated with semantic elements X2, X3, X4 and X5 are selected, also because their term search probabilities F5, F6, F7, F8, F9 and F10 are larger than a predetermined search probability threshold corresponding to the respective semantic element. Optionally, the predetermined search probability thresholds are different for the semantic elements included in one search query. Optionally, the predetermined search probability thresholds are equal for the semantic elements included in the same search query, and when no search term meets the requirement on the term search probability, the semantic element itself is listed as a search term.

Optionally, a search term includes a single semantic element which is included in the ordered sequence of semantic elements. Optionally, a search term includes two or more semantic elements that are all included in the received search query (i.e., the ordered sequence of semantic elements). Optionally, some search terms (e.g., X1 X2 A X3, X2 B X3, X2 C X3 X4 and X4 D X5) also include irrelevant semantic elements (e.g., A, B, C and D) that are not included in the received search query. These irrelevant semantic elements of the search terms are replaced with segmentation identifiers (e.g., O), and the search terms are modified to include only semantic elements included in the received search query and the segmentation identifiers.

A subset of the modified search terms correlated with the ordered sequence of semantic elements are then combined to form one or more combined search query based on a combination criterion. In accordance with an exemplary combination criterion, two modified search terms are selected, when a last semantic element of a first modified search term and a first semantic element of a second modified search term are two successive semantic elements in the ordered sequence of semantic elements. The segmentation identifiers are not counted for identifying the last semantic element in the first modified search term and for identifying the first semantic element of the second modified search term. For example, the modified search terms, X1 and X2 O X3 are identified for giving a part of a combined search query, because semantic elements X1 and X2 are two successive semantic elements in the ordered sequence of semantic elements, and another modified search term X4 X5 is further identified for giving another part of the combined search query, because X4 is a successive semantic element that follows semantic element X3 in search term X2 O X3. As shown in FIGS. 2A and 2B, nine combined search queries are obtained based on the modified search terms corresponding to the semantic elements included in the received search query.

When a search query provided by a user includes a first set of Chinese characters, the server acquires a plurality of search terms according to the first Chinese character set, and each search term is associated with at least one Chinese character in the first Chinese character set. As shown in FIG. 3B, the server performs a path combination operation on the plurality of search terms according to both the sequence of Chinese characters in the search query and the first and last Chinese characters included in the corresponding search terms. For example, the Chinese character X1 precedes the Chinese character X2 in the received search query, and the modified search terms X1 and X2|O|X3 constitute a part of a path which extends from modified search term X1 to modified search term X2|O|X3. The path further extends to another modified search term X4|X5 or X4|O|X5, such that the modified search terms on the path together include the ordered sequence of Chinese characters.

As shown in FIG. 2A, for each combined search query on each combination path, the server acquires a combined search probability by averaging term search probabilities of the search terms included in the respective combination path. Specifically, the server calculates the sum of term search probabilities of all the search terms in each path, and then divides the sum by the number of the search terms in each path to obtain the average of the term search probabilities of all the search terms in each path. For example, the combined search probability for path X1-X2 O X3-X4 X5 is (F4+F5+F8)/3.

It is noted that one skilled in the art knows that averaging the combined search probability for each combined search query is merely one exemplary method to calculate the combined search probability and that many other methods (e.g., weighted averaging) may also be applied to identify the combined search probability.

The server determines a specific combined search query and a corresponding combination path that are associated with a preferred combined search probability. In a specific example, the server compares the combined search probability of each path to determine the path having the preferred search probability. In some embodiments, two or more paths are determined to have the same preferred combined search probability, and the server may select any path of the two or more paths to combine the modified search terms and obtain the specific combined search query.

Further, the specific combined search query corresponding to the selected path that has a preferred combined search probability are segmented according to locations of the segmentation identifiers in the modified search terms of the specific combined search query. In some embodiments, in the path having the preferred combined search probability, the segmentation identifier included in the plurality of search terms may be a Chinese character or a specific identifier (such as 0 in FIGS. 3A and 3B). The server segments the search query, recombines the Chinese characters of the search query, and obtains a new set of search terms according to the positions of the specific identifiers in the path having the preferred search probability.

For example, assume that the path having the preferred combined search probability is X1-X2 0 X3-X4 X5. The search query is segmented to two new search terms X1 X2 and X3 X4 X5 because the segmentation identifier 0 is located between semantic elements X2 and X3. When a new search term is identified, the semantic elements included in the new search term are correlated with the new search term. By this means, the server is able to constantly and dynamically update the correlation between a semantic element and its search terms, the corresponding term search probabilities, and the semantic elements included in the search terms.

In various embodiments of the application, the query segmentation method is simple and convenient to operate, because it does not involve manual query segmentation or complicated databases, such as a dictionary. When the correlations between semantic elements and search terms are constantly and dynamically updated, erroneous query segmentation may be corrected quickly, and a high recognition rate can also be achieved for new search queries. Therefore, the overall accuracy of query segmentation is improved by using the query segmentation method described in the present application.

Figure 3A:
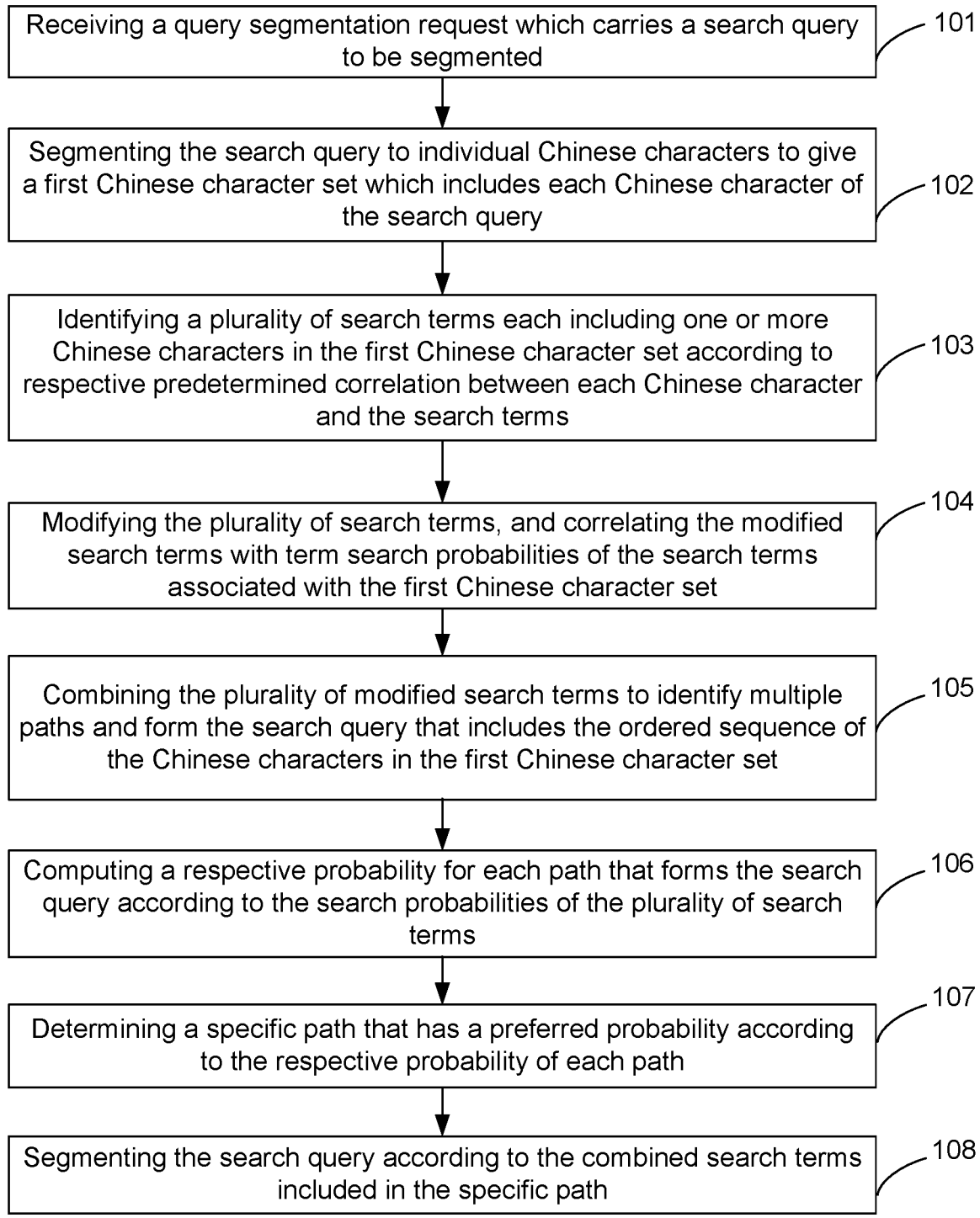
FIG. 3A is a flow chart of an exemplary search query segmentation method that segments a search query including some Chinese characters according to some embodiments of the application.
Figure 3B:
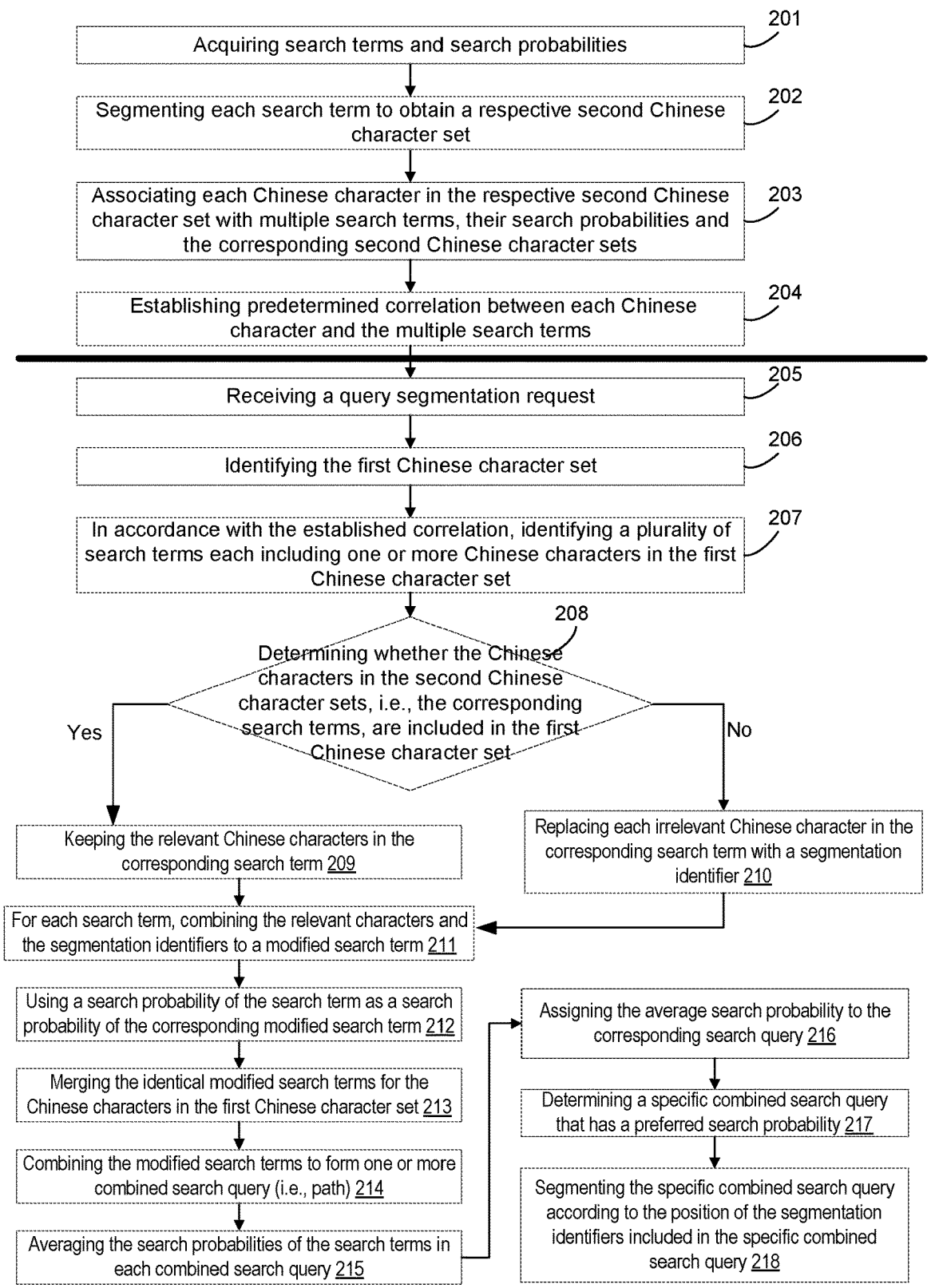
FIG. 3B is a flow chart of another exemplary search query segmentation method that segments a search query including some Chinese character according to some embodiments of the application.

FIG. 3A is a flow chart of an exemplary search query segmentation method 300 that segments a search query including some Chinese characters according to some embodiments of the application. Method 300 is, optionally, governed by instructions that are stored in a non-transitory computer readable storage medium and that are executed by one or more processors of a computational machine (e.g., a server). Each of the operations shown in FIG. 3A may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 300 may be combined and/or the order of some operations may be changed.

The server receives (101) a query segmentation request which includes a search query to be segmented. The server performs a search according to the search query provided by a client device. Specifically, the server is a search server that segments the search query and searches based on the corresponding query segmentation result.

In some embodiments, a client device includes a user interface which allows a user to manually input the search query. When the user implements a click operation to a search button, the client device sends a query segmentation request to the server. In some embodiments, the client device displays a list of popular search queries on the user interface. Upon detecting the click operation on a specific popular search query, the client device sends a query segmentation request associated with the specific popular search query to the server. The manner of triggering the query segmentation request at the client device is not limited to the examples described here.

In some embodiments, after segmenting the search query in accordance with the query segmentation method in the present application, the segmented search queries are further analyzed by some typical language analysis methods, e.g., phrase-based combination analysis and phrase application analysis. In some embodiments, the server merely segments the search query received from the client device, and does not further search a database or the Internet based on the segmented search query. The present application does not impose specific limitations on whether a search process follows segmentation of a search query.

The search query is segmented (102) to individual Chinese characters to give a first Chinese character set which includes each Chinese character of the search query. In some embodiments, the server segments the search query to individual Chinese characters and acquires the first Chinese character set according to the order of the Chinese characters of the search query. The first Chinese character set includes not only each Chinese character of the search query, but also adopts the orders of the Chinese characters in the search query. For example, the search query is "建立繁荣富强的社会主义国家", and the first Chinese character set obtained after segmentation includes Chinese characters 建, 立, 繁, 荣, 富, 强, 的, 社, 会, 主, 义, 国, and 家.

The server further identifies (103) a plurality of search terms each including one or more Chinese characters in the first Chinese character set according to respective predetermined correlation between each Chinese character and the search terms. Optionally, in accordance with the predetermined correlation, the Chinese characters in the first Chinese character set are correlated not only with the search terms, but also with a term search probability of each search term and a respective second Chinese character set that includes the Chinese characters in each of the search terms. Chinese characters of a second Chinese character set are obtained by segmenting the corresponding search term, and therefore, the second Chinese character set include each Chinese character of the search term and adopts the order of the Chinese characters in the search term. The server establishes the predetermined correlation according to a search record that tracks the search queries received from different users of the search service, and stores the predetermined correlation in a database.

In the above example based on the search query "建立繁荣富强 的社会主义 国家,," Chinese character 建 is correlated with a search term "建立稳定国家" based on a predetermined correlation, and the term search probability of the search term "建立稳定国家" is f0. The second Chinese character set includes Chinese characters 建, 立, 稳, 定, 国, and 家. Therefore, in accordance with the predetermined correlation, Chinese character 建 is at least correlated with the search term "建立稳定国家," the term search probability f0 of the search term "建立稳定国家," and the second Chinese character set including Chinese characters 建, 立, 稳, 定, 国, and 家..

After determining the plurality of search terms, the server further modifies (104) the plurality of search terms, and correlates (104) the modified search terms with the term search probabilities of the search terms associated with the first Chinese character set. Specifically, the server compares the search query with the search term corresponding to each Chinese character in the first Chinese character set. The respective search terms are modified to indicate the identical and distinct Chinese characters between the respective search terms and the search query.

In some embodiments, for each search term associated with the Chinese characters in the first Chinese character set, the server compares the first Chinese character set with the second Chinese character set generated based on the respective search term. Optionally, the respective search term is modified by using a first identifier to represent the Chinese character that is included in both the first Chinese character set and the second Chinese character set (i.e., in both the search query and the respective search term). Optionally, the respective search term is modified by using a second identifier to represent the Chinese character that is included in the second Chinese character set, but not in the first Chinese character set (i.e., included in the respective search term, but not in the search query). Therefore, in some embodiments, the respective modified search term includes the first identifier, the second identifier or both identifiers. In some embodiments, when only the second identifiers are applied to modify the respective search term, the Chinese characters that remains in the respective modified search term follows the orders of the Chinese characters in the search query. Each of the first identifiers and the second identifiers is optionally a Chinese character, a number, or a symbol, and is not limited by the examples used in the present application.

Assume that the first identifier and the second identifier are 1 and 0, respectively. In the above example, the first Chinese character set includes Chinese characters 建, 立, 繁, 荣, 富, 强, 的, 社, 会, 主, 义, 国, and 家, and the second Chinese character set Chinese characters 建, 立, 稳, 定, 国, and 家.. The same Chinese characters 建, 立, 国, and 家 included in both the first and second Chinese character sets are represented by 1, and the distinct Chinese characters in the first and second Chinese character sets are represented by 0. The search term 建立稳定国家 is then modified to 110011, or to 建立00国家 according to the orders of the Chinese characters in the received search query.

In accordance with a path combination operation, the server combines (105) the plurality of modified search terms to identify multiple paths and form the search query that includes the ordered sequence of the Chinese characters in the first Chinese character set. A respective probability is further computed (106) for each path that forms the search query according to the search probabilities of the plurality of search terms.

Each path includes one or more modified search terms. When the path includes only one modified search term, the server uses the search probability of the modified search term as the search probability of the path. When the path includes a plurality of modified search terms, the server combines the search probabilities of the plurality of modified search terms, and uses the combination result as the search probability of the path. Optionally, the combination result averages the search probabilities of the plurality of modified search terms. Optionally, the combination result is a preferred probability of the search probabilities of the plurality of modified search terms. One skilled in the art knows that many other methods may also be used to determine the combination result based on the search probabilities of the modified search terms.

A specific path that has a preferred probability is determined (107) according to the respective probability of each path, and the search query is segmented (108) according to the combined search terms included in the specific path.

In some embodiments, query segmentation method 300 is simple and convenient to operate, because it does not involve manual query segmentation or complicated databases, such as a dictionary. When the correlations between Chinese character words and search terms are constantly and dynamically updated, erroneous query segmentation may be corrected quickly, and a high recognition rate can also be achieved for new search queries. Therefore, the overall accuracy of query segmentation is improved by using query segmentation method 300 described here.

In some embodiments, in accordance with predetermined correlation between a specific Chinese character and a search term, the Chinese character is correlated a search term that includes the specific Chinese character, a term search probability of the search term and a respective second Chinese character set that includes the Chinese characters in the search term.

In some embodiments, the search terms for the first Chinese character set include a plurality of first search terms. The server obtains a plurality of second search terms and a plurality of term search probabilities based on search queries that are received by the server within a predetermined period of time. Each of the plurality of second search terms is segmented to a plurality of respective second Chinese characters. The second Chinese characters that are associated with the second search terms include the Chinese characters in the first Chinese character set. In accordance with segmentation of the plurality of second search terms, each second Chinese character is correlated with one or more second search terms, term search probabilities of the one or more second search terms, and the other Chinese characters in each of the one or more second search terms. Such correlations are further used to identify the predetermined search terms for the Chinese characters in the first Chinese character set.

In some embodiments, for each Chinese character in the first Chinese character set, the corresponding search terms are modified by determining whether some Chinese characters in the respective search terms are also included in the first Chinese character set. In accordance with the determination that some Chinese characters in the respective search terms are also included in the first Chinese character set, these Chinese characters have the same order in both the search terms and the received search query. A search term and a corresponding modified search term are associated with the same term search probability.

In some embodiments, for each search term associated with the Chinese characters in the first Chinese character set, the respective search term is modified by keeping the Chinese characters that are included in both the first Chinese character set and the second Chinese character set (i.e., in both the search query and the respective search term), and using a specific identifier to represent the Chinese character that is included in the second Chinese character set, but not in the first Chinese character set (i.e., included in the respective search term, but not in the search query).

In some embodiments, the search query is segmented according to the combined search query that is associated with a specific combination path having a preferred search probability. Specifically, the search query is segmented at locations where the specific identifiers are located.

In some embodiments, two or more modified search terms are identical after some Chinese characters are replaced with segmentation identifiers. Query segmentation method 300 further includes merging the identical two or more modified search terms to one, and obtaining a term search probability corresponding to the merged search term based on the term search probabilities of the identical two or more modified search terms. For example, the term search probability of the merged search term is equal to a sum of the term search probabilities of the identical two or more modified search terms.

FIG. 3B is a flow chart of another exemplary search query segmentation method 350 that segments a search query including some Chinese characters according to some embodiments of the application. Method 350 is, optionally, governed by instructions that are stored in a non-transitory computer readable storage medium and that are executed by one or more processors of a computational machine (e.g., a server). Each of the operations shown in FIG. 3B may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 350 may be combined and/or the order of some operations may be changed.

The server acquires (201) a plurality of search terms and their corresponding term search probabilities according to search requests received during a predetermined period of time. The server is optionally associated with a user interface that allows users of the search service provided by the server to input the search requests. In some embodiments, the user interface is a search webpage loaded on a web browser, and examples of such a search webpage include, but are not limited to, Baidu.com, Google.com and the like. In some embodiments, the predetermined period of time is determined by the server or another server that supports the search webpage.

Specifically, when a user enters a search query, a first server of a search web site acquires the search terms included in the search query, and tracks the respective search probability of each search term. Optionally, the first server of the predetermined website updates the search terms and the search probabilities of the search terms to a second server that segments the search query, at least once within the predetermined period of time. Optionally, the first server of the predetermined website sends the search terms and the search probabilities of the search terms acquired within the predetermined period of time to the server, upon receiving a request from the second query segmentation server.

In some embodiments, the query segmentation server (e.g., the second server) acquires search terms and their search probabilities from the predetermined website in real-time. Specifically, the server of the predetermined website (e.g., the first server) acquires search terms input by the user in real time, optionally calculates search probabilities of the search terms in real time, and sends the search terms and the optional search probabilities to the query segmentation server, such that the query segmentation server acquires the plurality of search terms and search probabilities in real time. In some embodiments, the first server of the predetermined website merely sends the search terms to the second server for query segmentation, and the second server identifies the term search probabilities for the search terms by itself.

As such, the search terms and search probabilities are dynamically tracked for the search queries inputted at the predetermined website, which allows erroneous query segmentation to be corrected and new vocabulary to be recognized promptly. For example, when new words (e.g., "高富帅" and "给力") emerged in the predetermined website, they can be quickly identified based on the query segmentation methods described in the present application, and updated in a database containing the search terms.

The server (i.e., the query segmentation server) segments (202) each search term to individual Chinese characters, and obtains a respective second Chinese character set. Specifically, the server segments a plurality of search terms to individual Chinese characters, and obtains a plurality of second Chinese character sets for the plurality of search terms. As such, the server establishes a correlation between the second Chinese character set and each individual Chinese character in the second Chinese character set.

For example, the server obtains some search terms, search probabilities corresponding to these search terms, and second Chinese character sets based on segmentation of the search terms as shown below in table 1.

TABLE 1

| Search Terms | Search Probabilities | The Second Chinese Character sets |
| --- | --- | --- |
| 可乐 | f1 | 可、乐 |
| 可口可乐 | f2 | 可、口、可、乐 |
| 可爱 | f3 | 可、爱 |
| 快乐 | f4 | 快、乐 |

The server associates (203) each Chinese character obtained by segmentation with a plurality of search terms including the Chinese character, the search probabilities of the plurality of search terms and the second Chinese character sets of the plurality of search terms. Further, in the example shown in Table 1, the Chinese character "可" is associated with three search terms (including "可乐," "可口," "可乐可爱") based on Table 1, the search probabilities of the three search terms, and three second Chinese character sets.

The server establishes (204) the predetermined correlation for a plurality of Chinese characters obtained by segmentation. In accordance with the predetermined correlation, each Chinese character is correlated with the multiple search terms, the corresponding search probabilities and the second Chinese character sets including Chinese characters of the multiple search terms. In some embodiments, operations 203 and 204 further includes: for each Chinese character, determining a plurality of search terms that includes the respective Chinese character, and establishing the correlation among each Chinese character, the plurality of search terms including the respective Chinese character, the search probabilities of the plurality of search terms, and the second Chinese character sets of the plurality of search terms.

TABLE 2

| Chinese Character | Search Terms | Search Probabilities | The Second Chinese Character sets |
|---|---|---|---|
| 可 | 可乐 | f1 | 可、乐 |
|  | 可口可乐 | f2 | 可、口、可、乐 |
|  | 可爱 | f3 | 可、爱 |

In some embodiments, the predetermined correlation is identified for each Chinese character obtained by segmentation as shown below in Table 3.

TABLE 3

| Chinese character | search term | search probability | the second Chinese character set |
|---|---|---|---|
| 可 | 可乐 | f1 | 可、乐 |
|  | 可口可乐 | f2 | 可、口、可、乐 |
|  | 可爱 | f3 | 可、爱 |
| 乐 | 可乐 | f1 | 可、乐 |
|  | 可口可乐 | f2 | 可、口、可、乐 |
|  | 快乐 | f4 | 快、乐 |
| 口 | 可口可乐 | f2 | 可、口、可、乐 |
| 爱 | 可爱 | f3 | 可、爱 |
| 快 | 快乐 | f4 | 快、乐 |

In some embodiments, operations 203 and 204 further include: ordering the Chinese characters segmented from the acquired search terms according to an inverted index of each Chinese character, and establishing a correlation between each Chinese character and the search terms that includes the respective Chinese character based on the respective inverted index.

In some embodiments, the server that implements query segmentation method 350 identifies correlation among search terms, corresponding term search probabilities and Chinese characters in the corresponding second Chinese character sets. Such correlation is updated when a new search term is identified together with a new term search probability and a new second Chinese character set. As such, the correlation associated with the search terms is directly maintained in a database of the server, and can be used to segment new search queries received from a user.

Then, a query segmentation request is received (205), and the request includes a search query to be segmented. For example, the user inputs the search query, "可乐," at a user interface, and the following operations 206-218 are implemented to segment the search query, "可乐." When the user inputs a more complicated search query at the user interface, the query segmentation process is implemented in a similar manner.

The search query is segmented into individual Chinese characters, and a first Chinese character set including the individual Chinese characters is identified (206). Specifically, the server segments the search query, "可乐," Chinese characters 可 and 乐, and the first Chinese character set includes Chinese characters 可 and 乐.

The server identifies (207) a plurality of search terms each including one or more Chinese characters in the first Chinese character set according to the predetermined correlation. In particular, the identifying includes, for each Chinese character in the first Chinese character set or in the search query, identifying one or more search terms, the search probabilities of the search terms, and the second Chinese character sets each including the Chinese chanters in one of the search terms based on the predetermined correlation associated with the respective Chinese character in the first Chinese character set. Here, the predetermined correlation has been established via operations 201-204 for each Chinese character in the first Chinese character set.

In the specific example associated with the search query, "可乐," Chinese character 可 is correlated with three search terms including "可乐," "可口可乐" and "可爱." Search term, "可口可乐," is further associated with a second Chinese character set that includes Chinese characters 可, 口, 可, and 乐.

For each Chinese character in the first Chinese character set or in the search query, it is further determined whether the Chinese characters in second Chinese character sets, i.e., the corresponding search terms, are included in the first Chinese character set. In accordance with a determination that some Chinese characters in the corresponding search terms are included in the first Chinese character set, these relevant Chinese characters are kept (209) in the corresponding search terms. Stated another way, the relevant Chinese characters in the search terms are replaced with segmentation identifiers that are identical to the respective relevant Chinese characters. Further, in accordance with a determination that some Chinese characters in the corresponding search terms are not included in the first Chinese character set, these irrelevant Chinese characters are replaced (210) with a respective segmentation identifier (e.g., a specific Chinese character, number or sign) in the corresponding search terms. By this means, the plurality of search terms associated with each Chinese character in the first Chinese character set are modified by selectively replacing the Chinese characters included in the search terms.

In the specific example associated with the search query, "可乐," search term "可口可乐" is correlated with Chinese character "可" of the search query, and the server determines whether each Chinese character 可, 口, 可, or 乐 in the second Chinese character set are included in the first Chinese character set that includes Chinese characters 可 and 乐. Therefore, Chinese characters 可 and 乐 in the search term "可口可乐" are not modified, but Chinese character 口 is replaced with a segmentation identifier (e.g., O or 0)

The server combines (211) the relevant Chinese characters and the segmentation identifiers for the irrelevant Chinese characters into the respective modified search term according to the order of the Chinese characters in the search term. In the specific example associated with the search query, "可乐," the server combines the relevant Chinese characters and the segmentation identifiers of the Chinese characters (including 可, 口, 可, and 乐) in the second Chinese character set into a modified search term, "可 0 可 乐."

Each search term associated with the Chinese characters in the first Chinese character set (or the search query) and its modified search term are associated (212) with a term search probability. For example, as shown in Table 3, search term "可口可乐" and the corresponding modified search term, "可 0 可 乐" have a term search probability f2.

In some embodiments, after replacing the irrelevant Chinese characters with the segmentation identifier, it is determined that two or more modified search terms are identical. The server merges (213) the two or more identical modified search terms, and the search probability of the merged search term is adjusted to the sum of the search probabilities of the two or more identical modified search terms.

In a specific example, a search query "可口可乐" is received from a user of the search service provided by the server. Chinese character 可 is associated with search term "可乐" and search term "可爱." Both search terms "可乐" and "可爱" are modified to "可 0" when their irrelevant characters are replaced with segmentation identifier 0. The identical modified search terms "可 0" are merged, and the merged search term "可 0" is associated with a term search probability that combines the term search probabilities of the original search terms "可乐" and "可爱." As such, the term search probability of the merged search term is equal to f1+f3.

The server further performs path combination operations on the plurality of modified search terms associated with the Chinese characters in the first Chinese character set to obtain multiple paths that give the search query received from the user. In particular, the modified search terms are combined (214) to form one or more combined search queries based on different paths.

In some embodiments, when the server has detected that the last Chinese character in a first modified search term and the first Chinese character in a second modified search term in the plurality of search terms are two successive Chinese characters in the search query, the server combines the first modified search term and the second modified search term on a path that is directed from the first modified search term to the second modified search term. When the path between the first and second search terms is established, more modified search terms can similarly precede the first modified search term or follow the second modified search term. These modified search terms form a combined search query based on a full path, and includes every Chinese character in the received search query. By this means, the server may obtain more than one combined search queries based on different paths.

Operations 215-218 are explained in view of FIG. 2B which illustrates exemplary path combination operations associated with search query segmentation method 350. In a specific example, a search server receives a search query that includes an ordered sequence of Chinese characters: X1 X2 X3 X4 X5, and the corresponding first Chinese character set includes Chinese characters X1, X2, X3, X4 and X5.

The server acquires a plurality of modified search terms according to the first Chinese character set, and each search term is associated with at least one Chinese character in the first Chinese character set. The plurality of modified search terms and term search probabilities of the plurality of modified search terms are listed on FIG. 2B (the Chinese characters are separated by separators). The server performs path combination on the plurality of modified search terms according to the order of the Chinese characters in the search query, the first Chinese character and the last Chinese character included in each of the plurality of modified search terms. For example, for the modified search terms "X1" and "X2|0|X3", the Chinese character "X1" precedes the Chinese character "X2" in the search query X, and therefore, the modified search terms "X1" and "X2|0|X3" constitute a path. The path direction is directed from the Chinese character "X1" to the Chinese character "X2." Similarly, this path may be further extended to modified search terms "X4|0|X5" and "X4|X5."

The server averages (215) the term search probabilities of the modified search terms in each combined search query (i.e., path), and assigns (216) the average search probability to the corresponding combined search query. Specifically, the server calculates the sum of search probabilities of all the modified search terms in each path, and then divides the sum obtained by the number of the modified search terms in each path to obtain the average of the search probabilities of all the modified search terms in each path.

In some embodiments, the search probability of the modified search term "X1" is F4, the search probability of the modified search term "X2|0|X3" is F5, and the search probability of the modified search term "X4|X5" is F8. Therefore, the average of the search probabilities of the modified search terms in the path "X1"-"X2|0|X3"-"X4|X5" is (F4+F5+F8)/3. Thus, the search probability of the combined search query "X1"-"X2|0|X3"-"X4|X5" is (F4+F5+F8)/3.

It is further determined (217) that a specific combined search query (i.e., a path) has a preferred search probability. Specifically, the server compares the search probabilities of all paths to determine the specific combined search query having the preferred search probability. In some embodiments, two or more paths are associated with the same preferred search probability, and the server randomly selects one of the two or more paths to form the specific combined search query.

Then, the search query received from the user is (218) segmented according to the positions of the segmentation identifiers included in the specific combined search query having the preferred search probability. For example, as shown in FIG. 2B, assume that the path having the preferred search probability is "X1"-"X2|0|X3"-"X4|X5." The search query is segmented according to the path, and the word segmentation results obtained are "X1|X2" and "X3|X4|X5".

It should be understood that the particular order in which the operations in FIG. 3B have been described are merely exemplary and are not intended to indicate that the described order is the only order in which the operations could be performed. One of ordinary skill in the art would recognize various ways to segment a search query as described herein. Additionally, it should be noted that details of other methods described with respect to methods 100 and 300 (e.g., FIGS. 1 and 3A) are also applicable in an analogous manner to method 350 described above with respect to FIG. 3B. For brevity, these details are not repeated here.

Figure 4:
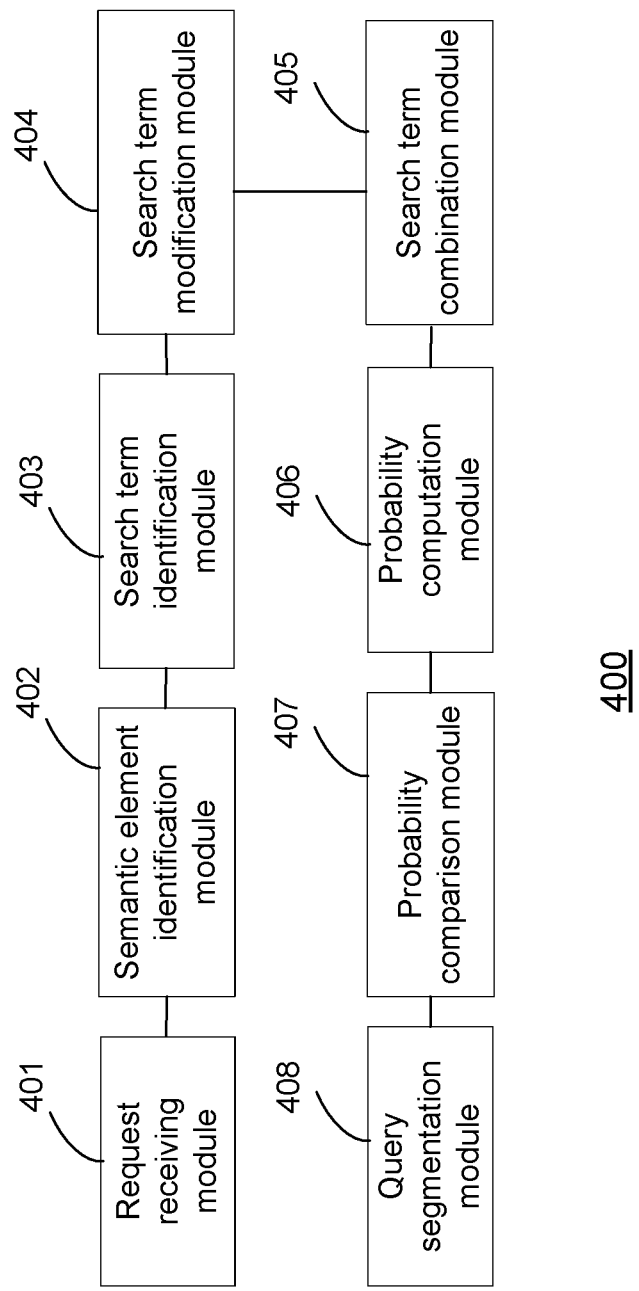
FIG. 4 is a block diagram of an exemplary query segmentation apparatus according to some embodiments of the application.

FIG. 4 is a block diagram of an exemplary query segmentation system 400 according to some embodiments of the application. Query segmentation system 400 includes a request receiving module 401, a semantic element identification module 402, a search term identification module 403, a search term modification module 404, a search term combination module 405, a probability computation module 406, a probability comparison module 407 and a query segmentation module 408.

The request receiving module 401 is used for receiving a query segmentation request which carries the search query to be segmented. The semantic element identification module 402 is coupled to the request receiving module 401, and used for segmenting the search query to individual semantic elements (e.g., Chinese characters, English words) to acquire the first semantic element set including each semantic element of the received search query.

The search term identification module 403 is coupled to the semantic element identification module 402, and used for correlating each semantic element in the first semantic element set with one or more search terms, one or more probability corresponding to one or more search terms, and the semantic elements included in each of the one or more search terms.

The search term modification module 404 is coupled to the search term identification module 403, and used for modifying the search terms correlated to the semantic elements in the search query by replacing each irrelevant semantic element in the search terms with a specific segmentation identifier. The search term combination module 405 is coupled to the search term modification module 404, and used for performing a path combination operation on the modified search terms to obtain multiple paths. Along each path, a subset of the search terms is combined to give the ordered sequence of semantic elements in the search query, except that the semantic elements are optionally separated by one or more specific segmentation identifiers.

The probability computation module 406 is coupled to the search term combination module 405, and is used for identifying the search probability of each path (i.e., each combined search query) according to the search probabilities of the modified search terms. The probability comparison module 407 is coupled to the probability computation module 406, and used for determining the path or the combined search query having a preferred search probability according to the search probability of each path. The query segmentation module 408 is coupled to the probability comparison module 407, and used for segmenting the search query according to the subset of search terms included in the path having the preferred search probability.

In some embodiments, query segmentation system 400 further includes the following modules:
  a search term acquisition module for acquiring a plurality of search terms from predetermined website that is searched within a predetermined period of time, and the corresponding search probabilities of the plurality of search terms;
  a second semantic element identification module segmenting the plurality of search terms to individual semantic elements to obtain a respective second semantic element set associated with each of the plurality of search terms;
  a semantic element information acquisition module associating each semantic element obtained by segmentation with a subset of the search terms that include the respective semantic element, the search probabilities of the subset of search terms and the corresponding second semantic element sets of the subset of search terms; and
  a correlation establishment module establishing correlation among the plurality of semantic elements obtained by segmentation, a subset of search terms, the search probabilities, and the second semantic element sets corresponding to the plurality of semantic elements.

In some embodiments, the search term modification module 404 further includes the following modules:
  a probability acquisition unit for acquiring a search probability of a search term as the search probability of the corresponding modified search term.
  a segmentation identifier acquisition unit for acquiring, for the search terms corresponding to each semantic element in the first semantic element set, the segmentation identifiers of the semantic elements in the second semantic element set by determining whether each of the semantic elements in the second semantic element set of the search terms is included in the first semantic element;
  a combining unit for when having obtained the segmentation identifiers of all the semantic elements in the second semantic element set, combining the segmentation identifiers of all the semantic elements into a modified search term according to the order of the semantic elements in the search query; and
  a probability acquisition unit for applying the search probability of the search term as the search probability of the modified search term.

In some embodiments, query segmentation system 400 further includes a merging module. When two or more modified search terms in the plurality of modified search terms are identical, the merging module is used for merging the two or more identical modified search terms, and the search probability of the merged search term is equal to the sum of the search probabilities of the at least two same modified search terms.

In some embodiments, the probability computation module 406 further includes the following modules:
  an average acquisition unit for acquiring the average of search probabilities of all the search terms in each path; and
  a probability acquisition unit for acquiring the average of the search probabilities of all the search terms in each path as the search probability of each path.

It should be noted that when query segmentation system 400 is applied to segment a search query, functional modules 401-408 are merely associated with one exemplary arrangement to implement different functions of query segmentation system 400. In practical use, the above-mentioned functions can be accomplished by different functional modules, that is, the internal configuration of the server can be divided into different functional modules to accomplish all or part of the above-mentioned functions. Moreover, query segmentation system 400 shares the same concept with query segmentation methods 100, 300 and 350 as explained with reference to FIGS. 1, 2A-2B, and 3A-3B. Query segmentation system 400 is also associated with a server 500 which is explained below with reference to FIG. 5.

Figure 5:
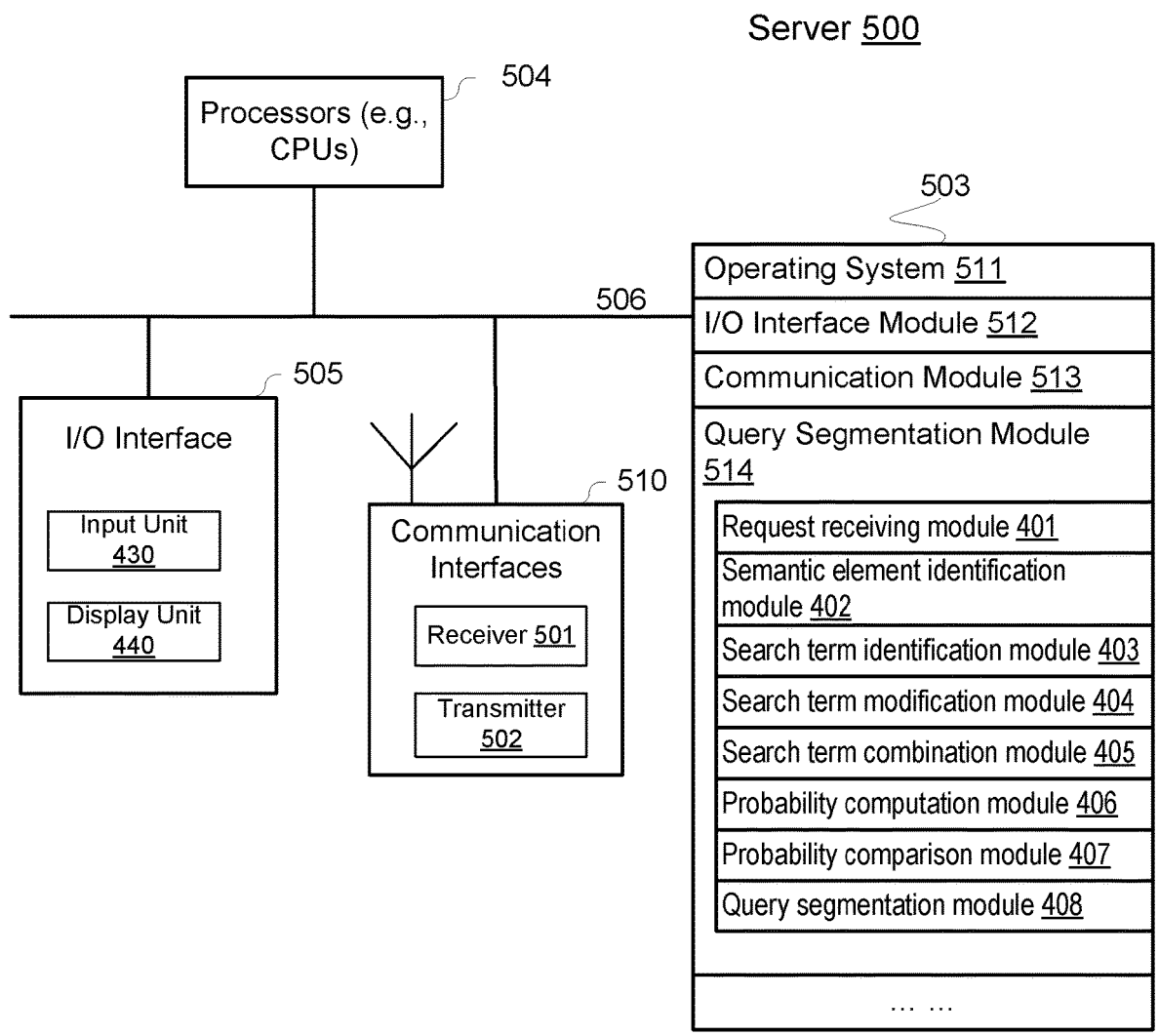
FIG. 5 is a block diagram of an exemplary server that segments a search query according to some embodiments of the application.

FIG. 5 is a block diagram of an exemplary server 500 that segments a search query according to some embodiments of the application. In some implementations, server 500 at least includes one or more processors 504 (e.g., central processing units) and a memory 503 for storing data, programs and instructions for execution by one or more processors 504. In some implementations, server 500 further includes one or more communication interfaces 510, an input/output (I/O) interface 505, and one or more communication buses 506 that interconnect these components.

In some embodiments, I/O interface 505 includes an input unit 430 and a display unit 440. Examples of input unit 430 include a keyboard, a mouse, a touch pad, a game controller, a function key, a trackball, a joystick, a microphone, a camera and the like. Additionally, display unit 440 displays information that is inputted by the user or provided to the user for review. Examples of display unit 440 include, but are not limited to, a liquid crystal display (LCD) and an organic light-emitting diode (OLED) display. In some implementations, input unit 430 and display unit 440 are integrated on a touch-sensitive display that displays a graphical user interface (GUI).

In some embodiments, communication buses 506 include circuitry (sometimes called a chipset) that interconnects and controls communications between system components.

In some embodiments, communication interfaces 510 further include a receiver 501 and a transmitter 502.

In some embodiments, memory 503 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 503 includes one or more storage devices remotely located from the one or more processors 504. In some embodiments, memory 503, or alternatively the non-volatile memory device(s) within memory 503, includes a non-transitory computer readable storage medium.

In some embodiments, memory 503 or alternatively the non-transitory computer readable storage medium of memory 503 stores the following programs, modules and data structures, instructions, or a subset thereof:

Operating System 511 that includes procedures for handling various basic system services and for performing hardware dependent tasks;

I/O interface module 512 that includes procedures for handling various basic input and output functions through one or more input and output devices, wherein I/O interface module 511 further includes an interface display module 440 that controls displaying of a graphical user interface;

Communication module 513 that is used for connecting server 500 to other server 500, via one or more network communication interfaces 510 (wired or wireless) and one or more communication networks, such as the Internet, other wide area networks, local area networks, metropolitan area networks, and so on; and Query segmentation module 513 that optionally includes a request receiving module 401, semantic element identification module 402, a search term identification module 403, a search term modification module 404, a search term combination module 405, a probability computation module 406, a probability comparison module 407 and a query segmentation module 408.

In some embodiments, the processor 504 invokes program codes to execute the following operations:

receiving a query segmentation request including a search query, wherein the search query further includes an ordered sequence of semantic elements (e.g., an ordered sequence of Chinese characters);

for each semantic element of the ordered sequence of semantic elements: correlating the respective semantic element with one or more predetermined search terms each at least including the respective semantic element, and in accordance with a determination that the respective one or more predetermined search terms include one or more irrelevant semantic elements, modifying the respective one or more predetermined search terms by replacing each irrelevant semantic element with a segmentation identifier;

combining a subset of the modified search terms associated with the ordered sequence of semantic elements to form a plurality of combined search queries based on a combination criterion, wherein each combined search query includes the ordered sequence of semantic elements and at least one segmentation identifier that separates the semantic elements of the ordered sequence of semantic elements;

determining a plurality of combined search probabilities each corresponding to one of the plurality of combined search queries; and in accordance with the plurality of combined search probabilities, identifying a specific combined search query, and segmenting the search query according to a location of the at least one segmentation identifier of the specific combined search query.

In some embodiments, for each semantic element of the ordered sequence of semantic elements, each of the respective one or more predetermined search terms is associated with a plurality of second semantic elements and a term search probability. Therefore, the respective semantic element is correlated with each of the respective one or more predetermined search terms, the plurality of respective second semantic elements and the respective term search probability of each of the respective one or more predetermined search terms.

In some embodiments, the processor 504 is used for invoking the program code to execute the following operations:

acquiring through the receiver 501 a plurality of search terms from predetermined website that is searched within a predetermined period of time, and the corresponding search probabilities of the plurality of search terms;

segmenting the plurality of search terms to individual semantic elements to obtain a respective second semantic element set associated with each of the plurality of search terms;

associating each semantic element obtained by segmentation with a subset of the search terms that include the respective semantic element, the search probabilities of the subset of search terms and the corresponding second semantic element sets of the subset of search terms; and establishing correlation among the plurality of semantic elements obtained by segmentation, a subset of search terms, the search probabilities, and the second semantic element sets corresponding to the plurality of semantic elements.

In some embodiments, the processor 504 is used for invoking the program code to execute the following operations:

acquiring, for the search terms corresponding to each semantic element in the first semantic element set, the segmentation identifiers of the semantic elements in the second semantic element set by determining whether each of the semantic elements in the second semantic element set of the search terms is included in the first semantic element;

when having obtained the segmentation identifiers of all the semantic elements in the second semantic element set, combining the segmentation identifiers of all the semantic elements into a modified search term according to the order of the semantic elements in the search query; and applying the search probability of the search term as the search probability of the modified search term.

In some embodiments, the processor 504 is used for invoking the program code to execute the following operations of: for each search term corresponding to each semantic element in the first semantic element set, using, the semantic element itself as the segmentation identifier of the semantic element (i.e., keeping the semantic element in the modified search term), when the semantic element in the second semantic element set of the search term is included in the first semantic element; and using a specific identifier (e.g., a number, a letter, and a sign) as the segmentation identifier to replace the semantic element in the modified search term, when the semantic element is not included in the first semantic element.

In some embodiments, the processor 504 is used for invoking the program code to execute the operation of segmenting the search query to acquire a query segmentation result of the search query according to the position of the segmentation identifier included in the modified search term in a combination path having a preferred search probability.

In some embodiments, the processor 504 is used for invoking the program code to execute the operation of merging the at least two identical modified search terms when there are at least two identical modified search terms in the plurality of modified search terms. The search probability of the merged search terms is the sum of the search probabilities of the at least two identical modified search terms.

In some embodiments, the processor 504 is used for invoking the program code to execute the operation of acquiring the average of the search probabilities of all the search terms in each path; and acquiring the average of the search probabilities of all the search terms in each path as the search probability of each path.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
   at a server having one or more processors and memory storing program modules to be executed by the one or more processors:
      receiving a search query, the search query including an ordered sequence of Chinese characters;
      for each Chinese character of the ordered sequence of Chinese characters:
         identifying one or more predetermined search terms for the Chinese character, wherein each of the one or more predetermined search terms comprises one or more Chinese characters including the Chinese character occupying a first position of the predetermined search term;
      forming a plurality of concatenated search queries by concatenating a subset of the predetermined search terms associated with the ordered sequence of Chinese characters, each concatenated search query including at least one segmentation identifier that separates the Chinese characters of the ordered sequence of Chinese characters;
      identifying a specific one of the plurality of concatenated search queries having a highest concatenated search probability;
      segmenting the search query into two or more search terms according to one or more locations of the at least one segmentation identifier in the specific concatenated search query; and
      identifying at least one new search term from the two or more search terms such that one of the ordered sequence of Chinese characters occupies the first position of the new search term.

2. The method according to claim 1, wherein the specific concatenated search query is modified by replacing each irrelevant Chinese character within the corresponding subset of the predetermined search terms with the at least one segmentation identifier.

3. The method according to claim 2, further comprising:
merging two or more identical search terms within the corresponding subset of the predetermined search terms after each irrelevant Chinese character has been replaced with the at least one segmentation identifier; and
obtaining a term search probability corresponding to the merged search term based on the term search probabilities of the two or more identical search terms.

4. The method according to claim 2, wherein each irrelevant Chinese character associated with each Chinese character of the ordered sequence of Chinese characters is identified when the corresponding irrelevant Chinese character is distinct from any Chinese character of the ordered sequence of Chinese characters.

5. The method according to claim 1, wherein each of the one or more predetermined search terms for the Chinese character is associated with a plurality of second Chinese characters and a term search probability, and identifying the one or more predetermined search terms for the Chinese character further comprises:
correlating the Chinese character with each of the one or more predetermined search terms, the plurality of respective second Chinese characters and the respective term search probability of each of the respective one or more predetermined search terms.

6. The method according to claim 1, wherein the ordered sequence of Chinese characters includes a plurality of first Chinese characters, and for each first Chinese character, the one or more search terms includes a plurality of respective first search terms, the method further comprising:
obtaining a plurality of second search terms and a plurality of term search probabilities based on search queries that are received by the server within a predetermined period of time;
segmenting each of the plurality of second search terms to a plurality of respective second Chinese characters, the plurality of second Chinese characters that are associated with the plurality of second search terms including the plurality of first Chinese characters;
in accordance with segmentation of the plurality of second search terms, establishing a Chinese character correlation for each of the second Chinese characters by associating each second Chinese character with one or more second search terms, term search probabilities of the one or more second search terms; and
wherein in accordance with the corresponding Chinese character correlation for each first Chinese character included in the second Chinese characters, each Chinese character of the ordered sequence of Chinese characters is correlated with the one or more predetermined search terms.

7. The method according to claim 1, wherein, for each Chinese character of the ordered sequence of Chinese characters, each search term and its corresponding modified search term are associated with a term search probability.

8. The method according to claim 7, wherein each concatenated search probability associated with a respective one of the plurality of concatenated search queries is computed by combining the corresponding term search probabilities of the corresponding subset of predetermined search terms.

9. The method according to claim 8, wherein, for each concatenated search query, the corresponding concatenated search probability is an average of the term search probabilities of the corresponding subset of predetermined search terms.

10. A server, comprising:
one or more processors; and
memory having instructions stored thereon, which when executed by the one or more processors cause the processors to perform operations including:
receiving a search query, the search query including an ordered sequence of Chinese characters;
for each Chinese character of the ordered sequence of Chinese characters:
identifying one or more predetermined search terms for the Chinese character, wherein each of the one or more predetermined search terms comprises one or more Chinese characters including the Chinese character occupying a first position of the predetermined search term;
forming a plurality of concatenated search queries by concatenating a subset of the predetermined search terms associated with the ordered sequence of Chinese characters, each concatenated search query including at least one segmentation identifier that separates the Chinese characters of the ordered sequence of Chinese characters;
identifying a specific one of the plurality of concatenated search queries having a highest concatenated search probability;
segmenting the search query into two or more search terms according to one or more locations of the at least one segmentation identifier in the specific concatenated search query; and
identifying at least one new search term from the two or more search terms such that one of the ordered sequence of Chinese characters occupies the first position of the new search term.

11. The server according to claim 10, wherein the specific concatenated search query is modified by replacing each irrelevant Chinese character within the corresponding subset of the predetermined search terms with the at least one segmentation identifier.

12. The server according to claim 11, wherein each irrelevant Chinese character associated with each Chinese character of the ordered sequence of Chinese characters is identified when the corresponding irrelevant Chinese character is distinct from any Chinese character of the ordered sequence of Chinese characters.

13. The server according to claim 10, wherein each of the one or more predetermined search terms for the Chinese character is associated with a plurality of second Chinese characters and a term search probability, and the operation for identifying one or more predetermined search terms for the Chinese character further comprises:
correlating the Chinese character with each of the one or more predetermined search terms, the plurality of respective second Chinese characters and the respective term search probability of each of the respective one or more predetermined search terms.

14. The server according to claim 10, wherein the ordered sequence of Chinese characters includes a plurality of first Chinese characters, and for each first Chinese character, the one or more search terms includes a plurality of respective first search terms, the operations further comprising:

obtaining a plurality of second search terms and a plurality of term search probabilities based on search queries that are received by the server within a predetermined period of time;

segmenting each of the plurality of second search terms to a plurality of respective second Chinese characters, the plurality of second Chinese characters that are associated with the plurality of second search terms including the plurality of first Chinese characters;

in accordance with segmentation of the plurality of second search terms, establishing a Chinese character correlation for each of the second Chinese characters by associating each second Chinese character with one or more second search terms, term search probabilities of the one or more second search terms; and wherein in accordance with the corresponding Chinese character correlation for each first Chinese character included in the second Chinese characters, each Chinese character of the ordered sequence of Chinese characters is correlated with the one or more predetermined search terms.

15. The server according to claim 10, wherein, for each Chinese character of the ordered sequence of Chinese characters, each search term and its corresponding modified search term are associated with a term search probability.

16. A non-transitory computer readable storage medium storing at least one program configured for execution by at least one processor of a server, wherein the at least one program further comprises instructions for:

receiving a search query, the search query including an ordered sequence of Chinese characters;

for each Chinese character of the ordered sequence of Chinese characters:
identifying one or more predetermined search terms for the Chinese character, wherein each of the one or more predetermined search terms comprises one or more Chinese characters including the Chinese character occupying a first position of the predetermined search term;

forming a plurality of concatenated search queries by concatenating a subset of the predetermined search terms associated with the ordered sequence of Chinese characters, each concatenated search query including at least one segmentation identifier that separates the Chinese characters of the ordered sequence of Chinese characters;

identifying a specific one of the plurality of concatenated search queries having a highest concatenated search probability;

segmenting the search query into two or more search terms according to one or more locations of the at least one segmentation identifier in the specific concatenated search query; and identifying at least one new search term from the two or more search terms such that one of the ordered sequence of Chinese characters occupies the first position of the new search term.

17. The non-transitory computer readable storage medium according to claim 16, wherein the specific concatenated search query is modified by replacing each irrelevant Chinese character within the corresponding subset of the predetermined search terms with the at least one segmentation identifier.

18. The non-transitory computer readable storage medium according to claim 16, wherein each of the one or more predetermined search terms for the Chinese character is associated with a plurality of second Chinese characters and a term search probability, and the operation for identifying one or more predetermined search terms for the Chinese character further comprises:

correlating the Chinese character with each of the one or more predetermined search terms, the plurality of respective second Chinese characters and the respective term search probability of each of the respective one or more predetermined search terms.

19. The non-transitory computer readable storage medium according to claim 16, wherein the ordered sequence of Chinese characters includes a plurality of first Chinese characters, and for each first Chinese character, the one or more search terms includes a plurality of respective first search terms, the operations further comprising:

obtaining a plurality of second search terms and a plurality of term search probabilities based on search queries that are received by the server within a predetermined period of time;

segmenting each of the plurality of second search terms to a plurality of respective second Chinese characters, the plurality of second Chinese characters that are associated with the plurality of second search terms including the plurality of first Chinese characters;

in accordance with segmentation of the plurality of second search terms, establishing a Chinese character correlation for each of the second Chinese characters by associating each second Chinese character with one or more second search terms, term search probabilities of the one or more second search terms; and wherein in accordance with the corresponding Chinese character correlation for each first Chinese character included in the second Chinese characters, each Chinese character of the ordered sequence of Chinese characters is correlated with the one or more predetermined search terms.

20. The non-transitory computer readable storage medium according to claim 16, wherein, for each Chinese character of the ordered sequence of Chinese characters, each search term and its corresponding modified search term are associated with a term search probability.

* * * * *